(12) United States Patent
Gauweiler et al.

(10) Patent No.: US 9,529,872 B2
(45) Date of Patent: Dec. 27, 2016

(54) ASYNCHRONOUS DATA PROCESSING

(75) Inventors: Thomas Gauweiler, Speyer (DE); Edgar Lott, Nussloch (DE); Manfred Hirsch, Heidelberg (DE); Masoud Aghadavoodi Jolfaei, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 12/976,760

(22) Filed: Dec. 22, 2010

(65) Prior Publication Data

US 2012/0166398 A1    Jun. 28, 2012

(51) Int. Cl.
| | | |
|---|---|---|
| G06F 7/00 | (2006.01) | |
| G06F 17/30 | (2006.01) | |
| G06F 11/07 | (2006.01) | |
| G06F 9/44 | (2006.01) | |
| G06Q 10/06 | (2012.01) | |

(52) U.S. Cl.
CPC ......... *G06F 17/3056* (2013.01); *G06F 9/4435* (2013.01); *G06F 11/0706* (2013.01); *G06Q 10/06* (2013.01)

(58) Field of Classification Search
CPC .................................................. G06F 11/0706
USPC ........................................ 707/705, 826, 613
See application file for complete search history.

(56) References Cited

U.S. PATENT DOCUMENTS

| | | | | |
|---|---|---|---|---|
| 6,601,192 B1 * | 7/2003 | Bowman-Amuah | | G06F 11/3688 714/38.12 |
| 6,912,520 B2 * | 6/2005 | Hankin | ............. | G06F 17/30607 |
| 6,970,844 B1 * | 11/2005 | Bierenbaum | .......... | G06Q 10/00 705/1.1 |
| 7,072,843 B2 * | 7/2006 | Menninger | ............ | G06Q 10/06 705/16 |
| 7,171,379 B2 * | 1/2007 | Menninger | ............ | G06Q 10/06 705/15 |
| 7,519,614 B2 * | 4/2009 | Glania | ................ | G06F 11/0751 |
| 7,542,980 B2 * | 6/2009 | Tsyganskiy | ............... | G06F 8/72 |
| 7,702,638 B2 * | 4/2010 | Tsyganskiy | ............... | G06F 8/72 707/999.1 |
| 7,720,879 B2 * | 5/2010 | Tsyganskiy | ............... | G06F 8/72 707/803 |
| 8,364,715 B2 * | 1/2013 | Schoknecht | .......... | G06Q 10/06 705/323 |
| 8,392,364 B2 * | 3/2013 | Horn | ...................... | G06Q 10/04 707/613 |
| 2003/0018490 A1 * | 1/2003 | Magers | .................. | G06Q 10/06 703/6 |
| 2005/0187933 A1 * | 8/2005 | Rapp | ................. | G06F 17/30362 |
| 2008/0046421 A1 * | 2/2008 | Bhatia | .................... | G06Q 10/10 |
| 2008/0071844 A1 * | 3/2008 | Gopal et al. | .................. | 707/204 |
| 2008/0120129 A1 * | 5/2008 | Seubert | .................. | G06Q 10/06 705/35 |
| 2008/0195651 A1 * | 8/2008 | Rachmiel et al. | ............ | 707/102 |
| 2009/0248429 A1 * | 10/2009 | Doenig et al. | .................... | 705/1 |

(Continued)

*Primary Examiner* — Usmaan Saeed
*Assistant Examiner* — Eliyah S Harper
(74) *Attorney, Agent, or Firm* — Mintz Levin Cohn Ferris Glovsky and Popeo, P.C.

(57) ABSTRACT

A method, a system, and computer-readable medium for processing of data are disclosed. An acknowledgement is received to store business object data. Based on the acknowledgement, an indication that the business object data is stored in a repository is generated. Processing of the business object data to enable storage in the repository continues while generating such indication.

18 Claims, 7 Drawing Sheets

(56) References Cited

U.S. PATENT DOCUMENTS

2009/0287628 A1* 11/2009 Indeck .................. G06N 5/025
                                                706/47
2011/0320494 A1* 12/2011 Fisher et al. .................. 707/780

* cited by examiner

ASYNCHRONOUS DATA PROCESSING

TECHNICAL FIELD

The subject matter described herein relates to data processing and in particular, to asynchronously processing of various tasks.

BACKGROUND

Application programs, sometimes referred to simply as applications, are programs that an end-user runs to accomplish certain tasks. Applications typically work in conjunction with one or more back-end systems, which store the data to be worked on, such as for example business objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") is designed to work in concert with application programs, and facilitates interaction between humans and computers by inviting and responding to user input. In order to accomplish various tasks, a user may initiate various applications, tasks, agents, etc. that may manipulate data in different ways to achieve results desired by the user. The data, whether or not manipulated by the user, may be stored in the system in many different forms. Correct and timely storage of data may provide for proper operation of the system and ensure future use of data by the user or other users.

SUMMARY

In some implementations, a computer-implemented method includes receiving an acknowledgement to store business object data, generating, based on the acknowledgement, an indication that the business object data is stored in a repository, and continuing, while generating the indication, the processing of the business object data to enable storage in the repository.

In some implementations, the following features may be optionally included. Receipt of the acknowledgement may include a determination that the processed business object data is consistent. An enterprise service framework may be configured to determine consistency of the processed business object data. The determination that the process business object data is consistent may be made prior to the continuing of the processing of the business object data to enable storage in the repository. Receipt of the acknowledgement may include a determination that the business object data is not consistent and correcting the business object data to generate consistent business object data. Continuing of the processing of the business object data to enable storage in the repository may be performed without an interaction from a user.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
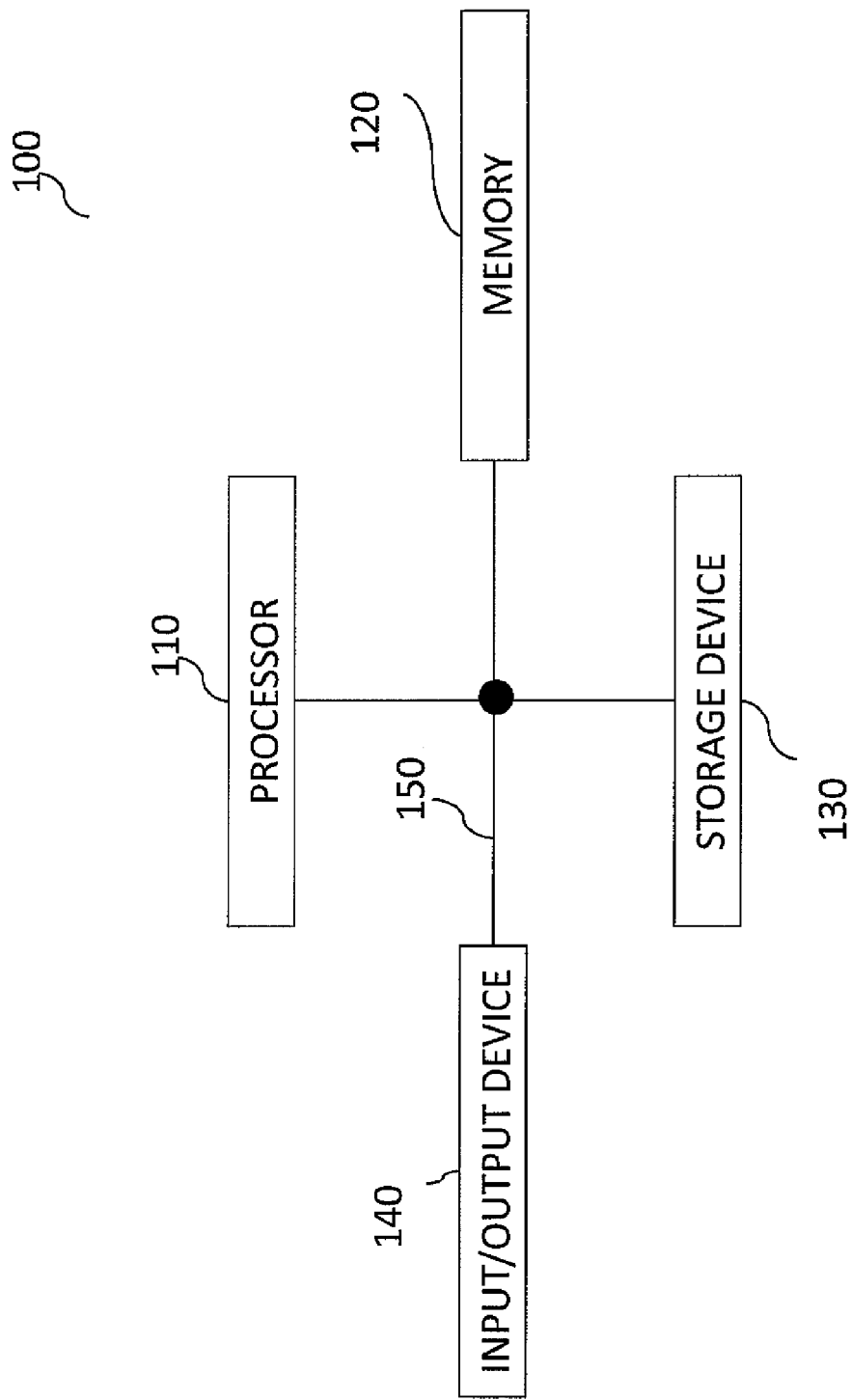
FIG. 1 illustrates an exemplary system for processing of business objects, according to some implementations of the current subject matter.

In some implementations, the current subject matter may be configured to be implemented in a system 100, as shown in FIG. 1. The system 100 may include a processor 110, a memory 120, a storage device 130, and an input/output device 140. Each of the components 110, 120, 130 and 140 may be interconnected using a communication mechanism, such as system bus 150.

The processor 110 may be configured to process instructions for execution within the system 100. In some implementations, the processor 110 may be a single-threaded processor. In alternate implementations, the processor 110 may be a multi-threaded processor. The processor 110 may be further configured to process instructions stored in the memory 120 or on the storage device 130, including receiving or sending information through the input/output device 140.

The memory 120 may store information within the system 100. In some implementations, the memory 120 may be a computer-readable medium. The memory 120 may be a volatile memory unit and/or a non-volatile memory unit. The storage device 130 may be capable of providing persistent storage for the system 100. In some implementations, the storage device 130 may be a floppy disk device, a hard disk device, an optical disk device, a tape device, non-volatile solid-state memory, or any other type of persistent storage.

The input/output device 140 may be configured to provide input/output operations for the system 100. In some implementations, the input/output device 140 may include one or more of: a keyboard, a pointing device, a display unit for displaying graphical user interfaces, and the like.

Figure 2:
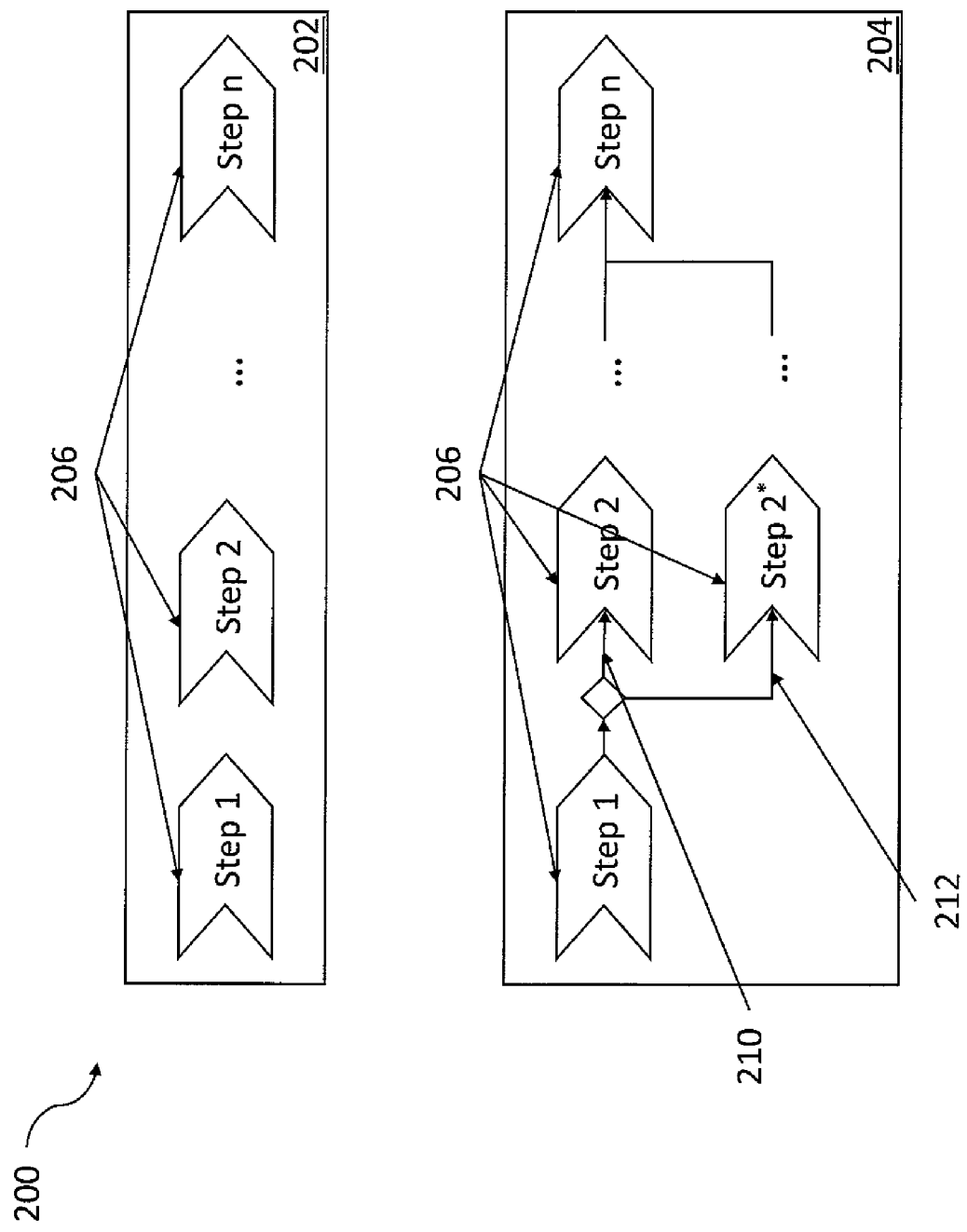
FIG. 2 illustrates an exemplary business process, according to some implementations of the current subject matter.
Figure 3:
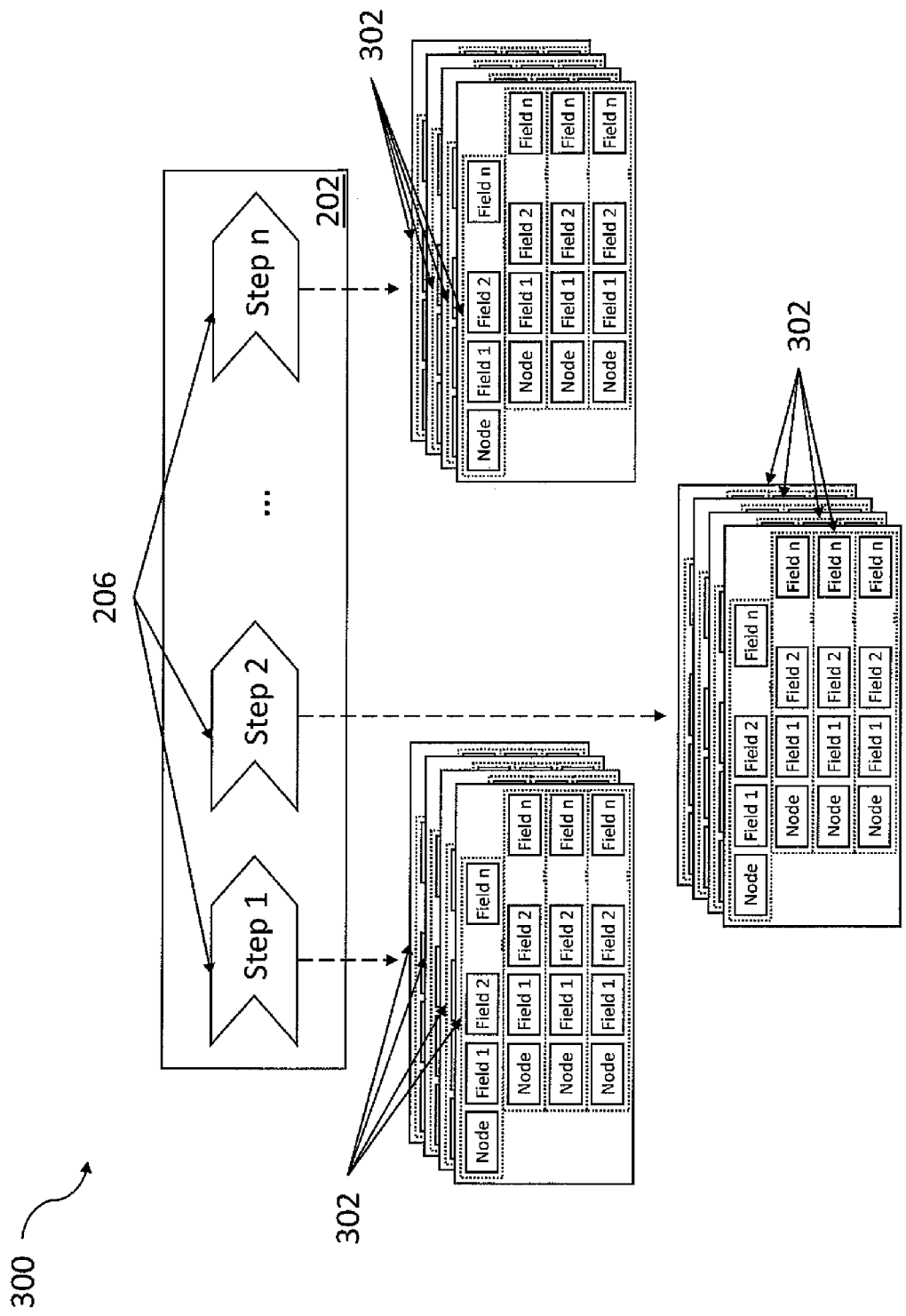
FIG. 3 illustrates another exemplary business process, according to some implementations of the current subject matter.

An organization may have a defined set of business processes that are executed to perform various functions of the organization. As shown in the diagrams 200 and 300 of FIG. 2 and FIG. 3, respectively, business processes of an organization may include relatively simple business process 202 and more complex business processes 204. Each business process generally includes a sequence of actions 204. Each action or operation 206 may involve one or more data objects, such as business objects 302. A business object is a data structure that includes at least one of a data element and a method, and the data is organized to provide a specific business task, such as a purchase order, a sales order, line items, invoices, customer contact information, customer payment account information, and the like. A complex business process 204 may include conditions leading to one or more concurrently running sub-processes 210 and 212.

Figure 4:
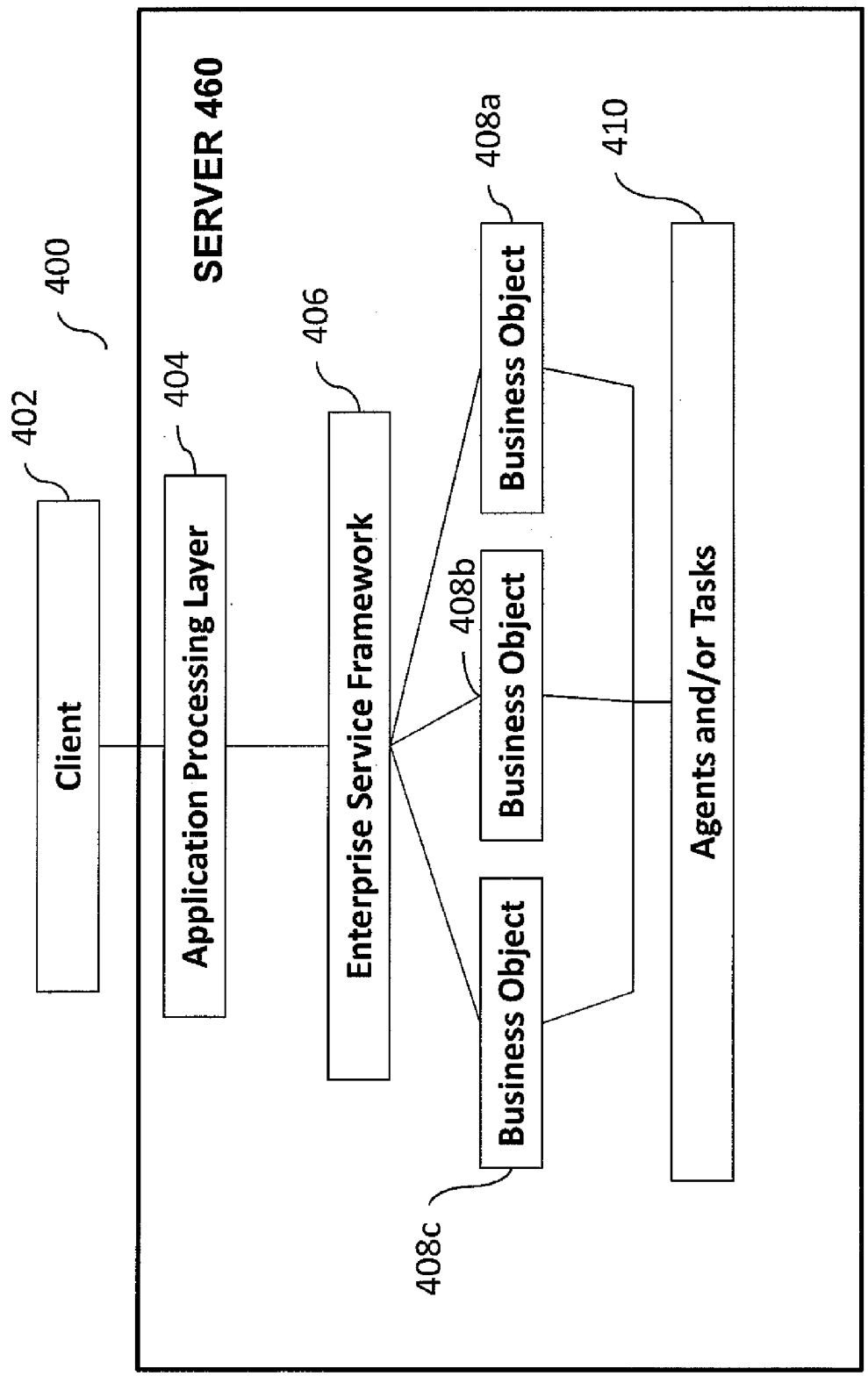
FIG. 4 illustrates an exemplary system for processing of business objects, according to some implementations of the current subject matter.

FIG. 4 illustrates an exemplary system 400 for processing of data structures, such as business objects. The system 400 may be configured to process and store business object data (e.g., the data fields of a business object). Examples of processing include: determining consistency of data of the data object, such a business object including data; performing saving procedures to store the data within a database and/or a repository; performing updates to the data that may be in a business object (e.g., updates due to newly created, entered, and/or saved data); and performing any other tasks that may manipulate, maintain and/or store data in the data objects.

In some implementations, the business object data may be stored in a repository that may be coupled to the system 400. The system 400 may be used to process various business objects (e.g., data structured according to a task, such as sales orders, a purchase orders, etc.).

A client application 402 may be used to enter, modify, update, etc. various data that may be processed and eventually passed onto a business object 408 for storage, retrieval, etc. The client application 402 may interact with an application processing layer 404 (such as, Advanced Business Application Programming or ABAP, a high-level programming language created by SAP AG, Walldorf, Germany) for the purposes of processing the data, such as, creation of sales orders, writing and editing reports and module pools, processing database table definitions, designing user interfaces, designing screens and flow logic, building function modules, etc.

The server 460 may be implemented as at least one processor and at least one memory and may include the application processing layer 404, an enterprise services layer 406, business objects 408, and agents 410.

The application processing layer 404 may be configured to interact with a framework (e.g., an enterprise service framework ("ESF") 406), which in turn, may be configured to interact with at least one business object 408. An example of the ESF is commercially available from SAP AG, Walldorf, Germany. The term "framework" refers to a system of interrelated components, such as programs and the like, providing a business system for performing business functions. The ESF 406 may abstract the business objects, which may be modeled as services (also referred to as enterprise services) providing for example purchase order generation, sales order generation, and the like. Aggregating services into business-level enterprise services may provide more meaningful building blocks for the task of automating enterprise-scale business scenarios.

The ESF 406 may include a persistent repository for storing relevant pre-existing enterprise services, which may be made available to selected users. By using a repository, these selected users may use the pre-existing enterprise services to aid in the implementation of new services and corresponding business objects. As noted, the business object may represent an object, such as a data structure including data and operations, of significance to a business. Examples of business objects include a purchase order, a sales order, a flight reservation, a shipping order, customer information, employee information, and the like. A service may thus provide an interface to enable other services and applications to access and process (e.g., create, fill-in, save, query, delete, print, send, and the like) the business object.

For exemplary illustrative purposes and for ease of description only, the following description will refer to a sales order and sales order data as an exemplary business object and business object data, respectively, although the current subject matter may be used with other types of data as well.

Business objects 408 and data related to business objects may be stored in a storage mechanism, such as a database or any other persistent storage repository. The system 400 may also be configured to include an agent 410, which may be initiated upon receipt of data related to the business objects 408. For example, agent 410 may be used to perform various tasks, such as update information related to business objects stored in the database, further process the data, determine the order of storing the data, perform various database update tasks, etc. In some implementations, agents may serve as a bridge or a proxy for tasks, which may be executed after an initial task has been completed. In this case, agents may collect data and transform it in such a way so that the tasks may be processed later on by other components in the system 400. Agents may be configured to generate a message as output, where the message is provided to components in the system 400. Some examples of the agents include at least one of the following an output management agent, a task agent, an application agent, a business information agent, a business-to-business messages agent, and others. The output management agent may collect data for generating a form, which may be sent to a printer or via an email to a recipient. The task agent may collect information that may be needed to process a task and send the information to a recipient (e.g., for approval). The application may collect data that may be needed for a process in another application area. The business information agent may collect data for notification of a business information warehouse. The business-to-business messages agent may collect data that may be used to send information to an external business partner (e.g., information may be sent from a buyer to a supplier). To ensure global data consistency, the agents may collect data during a current session of the system 400.

The enterprise service framework 406 may be configured to generate a message indicating that the data that the client 402 entered has been successfully saved in the system 400. The message indicating successful storage may be presented to the client 402 via a user interface in the form of a message, such as a Hypertext Markup Language ("HTML") message. In some implementations, if a sales order object is being created and saved by the client 402, the HTML message indicating successful storage of the data may also include a sales order number, which may confirm that a particular sales order has been created and saved to the system 400. In some implementations, the message may be presented by automatically updating of the client's user interface, or by sending an email, an instant message, a text message, a multimedia message, etc. to the client 402, or in any other form. In order to save the business object data to the system 400, the system 400 may be configured to perform a save-and-exit procedure ("save procedure"). The save procedure may entail various activities. Such activities may be performed synchronously and/or asynchronously, as discussed below.

Figure 5:
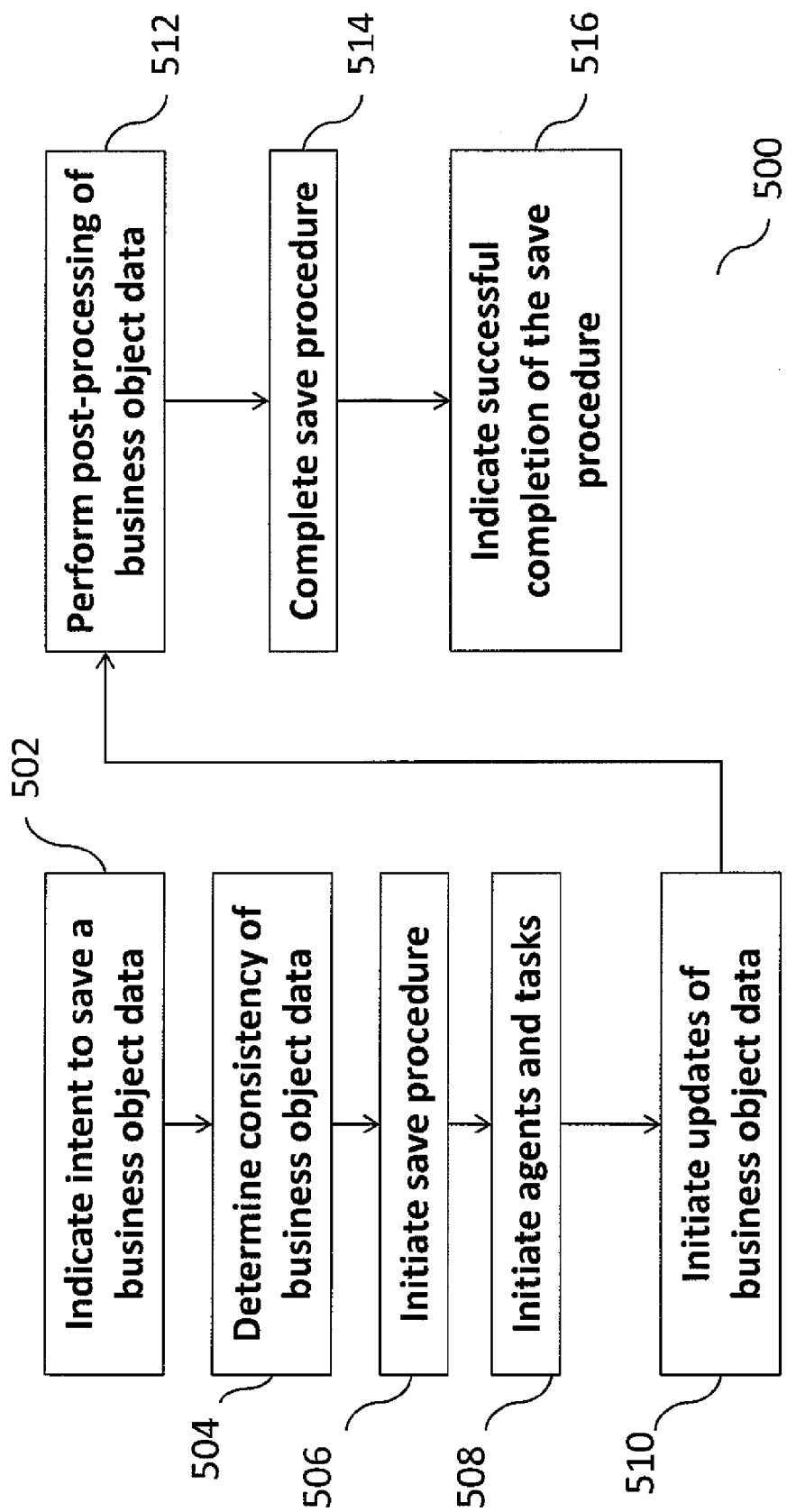
FIG. 5 is a flowchart of an exemplary synchronous method for storing business object data.

FIG. 5 illustrates an exemplary method 500 for saving business object in a data in a synchronous fashion. To initiate the save procedure, the client 402 may be configured to indicate to the application processing layer 404 that the data is ready to be saved, as indicated at 502. In the example of a sales order, the client 402 may be configured to enter the data related to the sales order (e.g., name, address, product information, payment information, etc.) and upon entry of the last portion of data, the client 402 may be presented with a request to save the sales order (e.g., an HTML message window appearing on client's user interface requesting save of the data) to the system. Once the client 402 affirms that the sales order should be saved (e.g., by pressing "YES" on the HTML message window), the application processing layer 404 passes this information to the enterprise service framework 406, which may request a check of consistency of the data entered by the client, at 504 (e.g., whether name, address, payment information are valid) and initiate a save procedure, at 506. The consistency check may be performed at the business object level, which may include a business object communicating with other business objects to determine validity of the data or may be done in any other fashion. The enterprise service framework 406 may be configured to perform finalization of the sales order and validate any information entered by the client 402.

Once the information is validated, the enterprise service framework 406 may be configured to perform a save procedure. The save procedure may create a sales order object business object within the database or other repository associated with system 400. Since a new sales order business object is created, other business objects existing in the database or repository may need to be updated with new information that was created by the client 402 as part of the new sales order business object. In that regard, the enterprise service framework 406 may cause initiation of various agents and tasks, at 508, that may perform such updates to the database or repository associated with system 400, at 510. These agents and tasks may be configured to communicate with various internal and/or external processes to perform any updates, tasks, and/or other operations.

Once these operations are completed, the application processing layer 404 may initiate post-processing of the sales order, at 512 and the enterprise service framework may complete the save procedure, at 514. Completion of the save procedure may be indicated to the client via a message stating that the save procedure was successful, at 516 (e.g., in case of a sales order, the enterprise service framework may present a message to the client indicating that the order was successfully saved along with an order number for the sales order). Because the aforementioned operations are performed synchronously, the client 402 is forced to wait until all of the above operations are completed prior to receiving an indication that the save procedure was successful.

Figure 6:
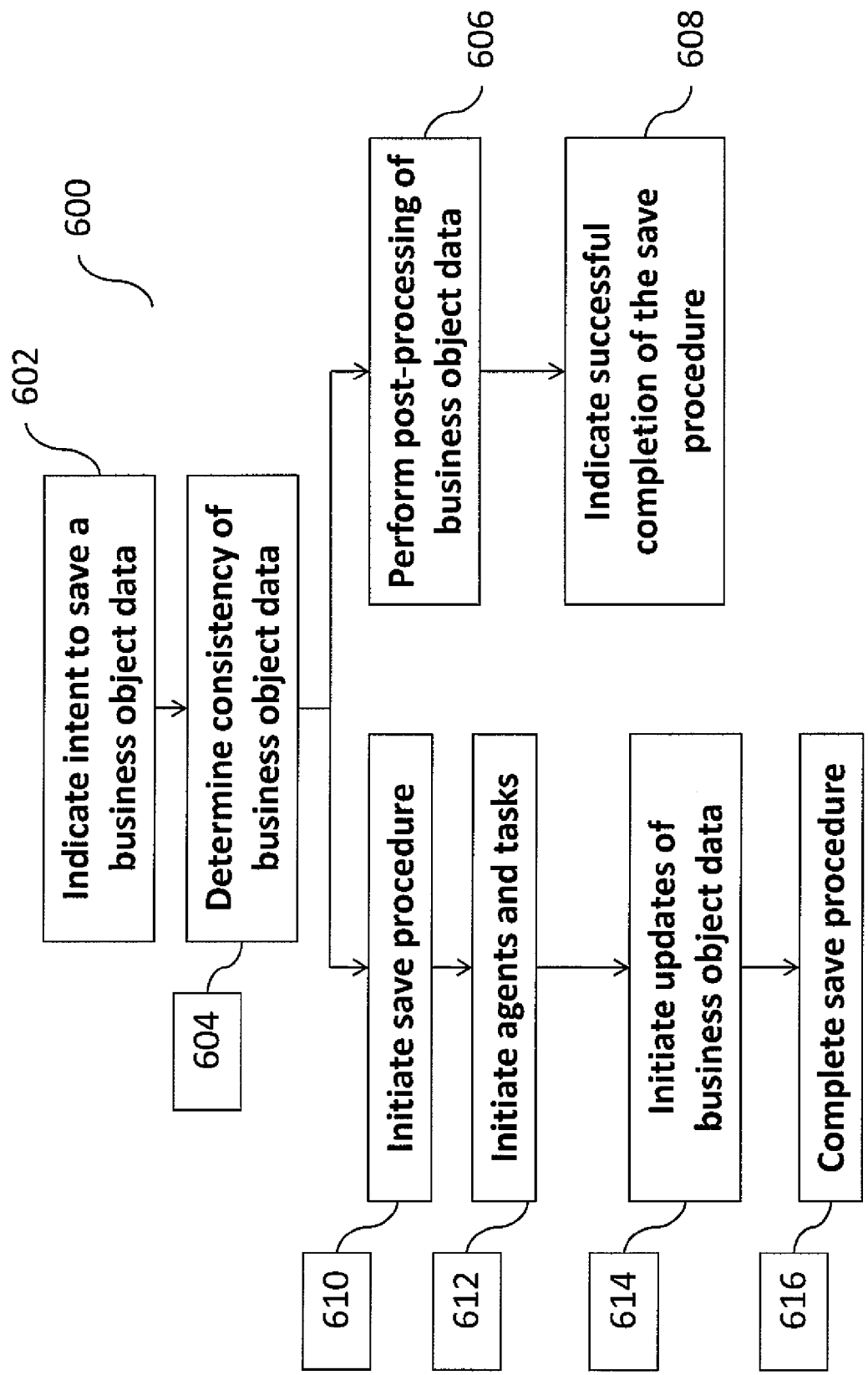
FIG. 6 is a flow chart of an exemplary asynchronous method for storing business object data, according to some implementations of the current subject matter.

FIG. 6 illustrates an exemplary method 600 for saving business object data in an asynchronous fashion. At 602, the client 402 may be configured to initiate a save procedure of the business object data (e.g., a sales order). The enterprise service framework 406 may be configured to finalize the sales order and perform a data consistency check, at 604. At this point, the enterprise service framework 406 may be configured to indicate to the application processing layer 404 that the business object data is consistent and the application processing layer 404 may be configured to perform post-processing of the sales order (e.g., generating a sales order number), at 606.

Once the post-processing of the sales order is completed, the enterprise service framework 406 may generate a message or an indication to the client 402 that the sales order business object was successfully saved, at 608. The generated message or indication may also include a sales order number. In some implementations, the order number may be part of the business object data. The sales order number may be determined prior to the indication to the client 402 that the sales order has been saved. The sales order number may be saved together with the business object and also displayed to the client 402. As such, the client 402 may be assured that the sales order business object has been properly processed and saved by the system 400. Further, from the client's perspective, it appears that the system 400 has finished processing and saving the sales order business object and that no further action or any other acknowledgement is required from the client 402. The indication that the saving of the sales order business object is successful may be possible based on the determination that the data entered by the client 402 is consistent. If the data is not consistent, the system 400 may be configured to generate a fatal error and prevent any further processing or saving of any data related to the sales order.

Simultaneously, while the system 400 indicates to the client 402 that the sales order has been successfully saved, the system 400 and, in particular, the enterprise service framework 404, may be configured to initiate the save procedure in order to save the sales order business object to the database or repository, at 610. Similarly to the method 500 for synchronously processing the data discussed above, the save procedure of the method 600 may create a sales order business object within the database or other repository associated with system 400. Once such sales order business object is created, other business objects existing in the database or repository may need to be updated with new information that was created by the client 402 in connection with the new sales order business object. The enterprise service framework 406 may cause initiation of various agents and tasks, at 612, that may perform such updates to the database or repository associated with system 400, at 614. In the save procedure of method 600, an indication of a successful save may be sent back to the client 402, while the agents 410 may still be preparing messages for later (asynchronous) processing by other components of the system 400.

Because the aforementioned operations are performed asynchronously with the post-processing and indication of successful save operations (e.g., at 606 and 608), the client 402 is not forced to wait until all of the above operations are completed prior to receiving an indication that the save procedure was successful. In some implementations, the time that the system 400 takes to indicate to the client 402 that the sales order has been successfully saved and present a sales order number to the client is reduced. In some implementations, the time it takes system 400 to indicate to the client 402 that the sales order is successfully saved using the method 500 may be four times longer than the time that it takes system 400 to indicate to the client 402 that the sales order is successfully saved using the method 600.

Figure 7:
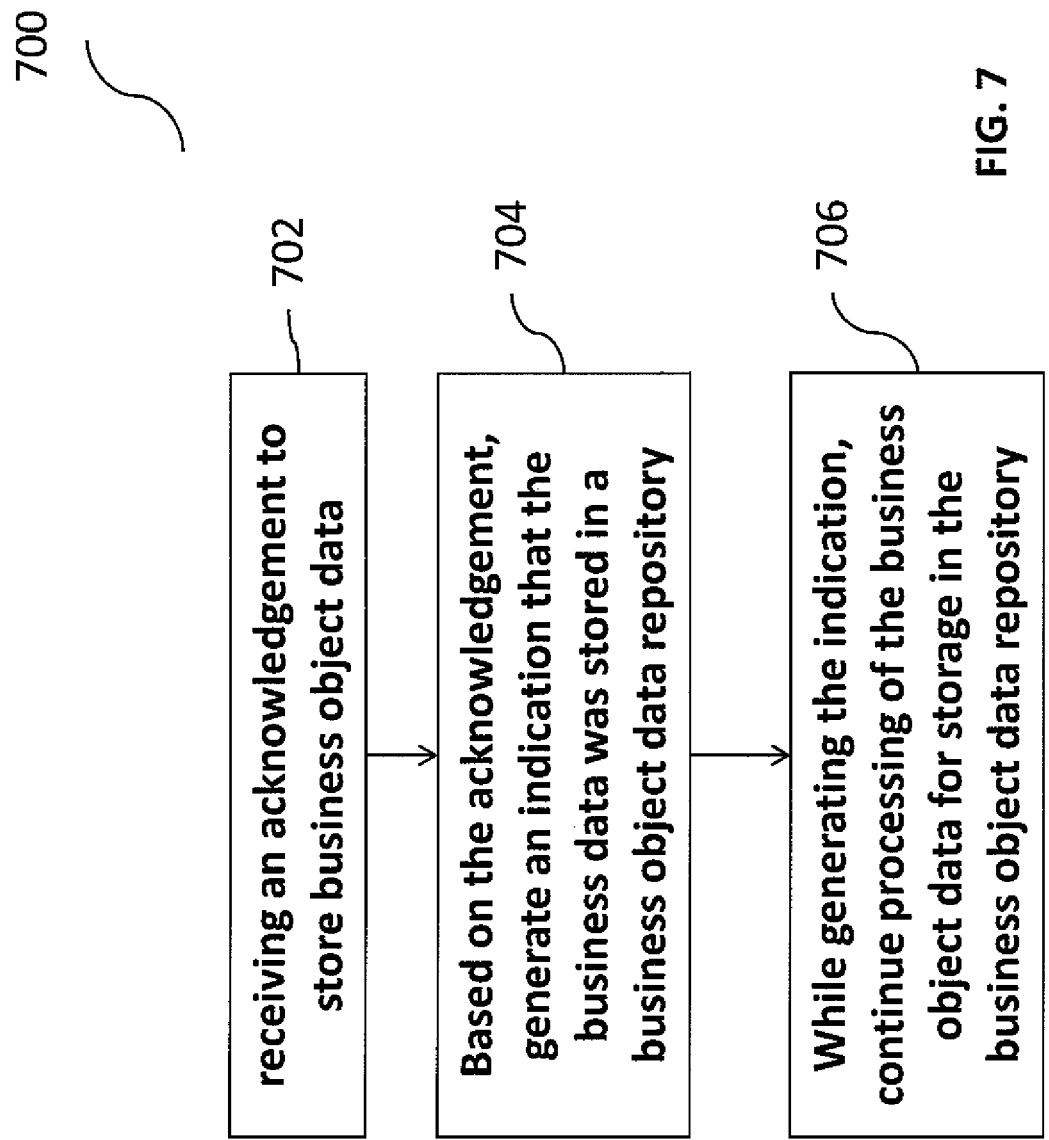
FIG. 7 illustrates an exemplary method for decoupling tasks, according to some implementations of the current subject matter.

FIG. 7 illustrates an exemplary method 700 for decoupling tasks. A client may manipulate business object data may in various ways, which may include creation, modification, updating, etc. of a business object (e.g., a sales order) and after completing the manipulation of the business object, the client may indicate that that the business object should be saved to the system (e.g., upon completion of a sales order, the client provides an acknowledgement that the order should be saved or otherwise stored). At 702, an acknowledgement that the client wishes to store the business object data may be received. This may be indicated by the client 402 by initiating a save of the business object. At 704, an indication that the business data was stored in a business object data repository may be generated based on the acknowledgement. The indication may include a message to the client that the business object has been successfully saved (e.g., presenting a sales order number to the client). While the indication is generated, processing of the business object data for storage in the business object data repository may continue, at 706, which may include actual saving of the business object to a database or the business object data repository.

In some implementations, the current subject matter may include the following optional features. Receipt of the acknowledgement may include a determination that the processed business object data is consistent. Consistency may be checked at the business object level and may be initiated by the enterprise service framework. In some implementations, a user may generate the acknowledgement (e.g., hitting a save button or selecting save from a menu of options, etc.) that the processing of the business object data is completed. The continuous processing may include a determination whether the business object data is consistent (as indicated at 604 in FIG. 6). This determination may be made prior to initiating or triggering of the asynchronous save procedure (at 610). In case, where the data is not yet consistent, the save message is not triggered and the client may receive an indication about the data inconsistency and may be provided with an opportunity to correct the data. The save procedure (at 610) may be triggered only if the data is consistent. Any further processing may be performed without user interaction and may only fail in case of programming errors resulting in a fatal error. In some implementations, the continuous processing of business object data may include post-processing of the business object data to prepare the business object data for storage in the business object data repository. The indication that the processing of business object data is complete may occur before the business object data is stored in the business object data repository.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed implementations may be implemented in various environments. Such environments and related applications may be specially constructed for performing the various processes and operations according to the disclosed implementations or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed implementations, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

As used herein, the term "user" may refer to any entity including a person or a computer.

Although ordinal numbers such as first, second, and the like may, in some situations, relate to an order; as used in this document ordinal numbers do not necessarily imply an order. For example, ordinal numbers may be merely used to distinguish one item from another. For example, to distinguish a first event from a second event, but need not imply any chronological ordering or a fixed reference system (such that a first event in one paragraph of the description may be different from a first event in another paragraph of the description).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description makes references to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A method comprising:
    receiving, at a processor, a message to store business object data;
    determining, at the processor, that the business object data is not consistent;
    inhibiting, at the processor when the business object data is not consistent, the business object data from being stored in a repository;
    correcting, at the processor when the business object data is not consistent, the business object data to generate business object data that is consistent, wherein the business object data is consistent when at least one of a name, an address, or a payment information is valid;
    generating, at the processor when the business object data is consistent, a storage indication based on the message, wherein the storage indication represents that the business object data is completely stored in the repository;
    sending, at the processor when the business object data is consistent, the generated storage indication before the business object data is completely stored in the repository, wherein the sending is performed without waiting for the business object data to be completely stored; and
    proceeding, at the processor after the sending, to process the business object data for storage in the repository.

2. The method according to claim 1, wherein the receiving the message further comprises:
    determining, at the processor, that the processed business object data is consistent.

3. The method according to claim 2, wherein an enterprise service framework is configured to determine consistency of the processed business object data.

4. The method according to claim 2, wherein determining that the processed business object data is consistent is made prior to the proceeding to process the business object data for storage in the repository.

5. The method according to claim 1, wherein the proceeding to process the business object data for storage in the repository is performed without an interaction from a user.

6. A computer program product comprising a non-transitory machine-readable medium storing instructions that, when executed by at least one programmable processor, cause the at least one programmable processor to perform operations comprising:
    receiving a message to store business object data;
    determining, that the business object data is not consistent;
    inhibiting, when the business object data is not consistent, the business object data from being stored in a repository;
    correcting, when the business object data is not consistent, the business object data to generate business object data that is consistent, wherein the business object data is consistent when at least one of a name, an address, or a payment information is valid;
    generating, when the business object data is consistent, a storage indication based on the message, wherein the storage indication represents that the business object data is completely stored in the repository;
    sending, when the business object data is consistent, the generated storage indication before the business object data is completely stored in the repository, wherein the sending is performed without waiting for the business object data to be completely stored; and
    proceeding, after the sending, to process the business object data for storage in the repository.

7. The computer program product according to claim 6, wherein the receiving the message further comprises:
    determining that the processed business object data is consistent.

8. The computer program product according to claim 7, wherein an enterprise service framework is configured to determine consistency of the processed business object data.

9. The computer program product according to claim 7, wherein determining that the processed business object data is consistent is made prior to the proceeding to process the business object data for storage in the repository.

10. The computer program product according to claim 6, wherein the proceeding to process the business object data for storage in the repository is performed without an interaction from a user.

11. A system comprising:
    at least one programmable processor; and
    a machine-readable medium storing instructions that, when executed by the at least one programmable processor, cause the at least one programmable processor to perform operations comprising:
        receiving a message to store business object data;
        determining that the business object data is not consistent;
        inhibiting, when the business object data is not consistent, the business object data from being stored in a repository;
        correcting, when the business object data is not consistent, the business object data to generate business object data that is consistent, wherein the business object data is consistent when at least one of a name, an address, or a payment information is valid;

generating, when the business object data is consistent, a storage indication based on the message, wherein the storage indication represents that the business object data is completely stored in the repository;

sending, when the business object data is consistent, the generated storage indication before the business object data is completely stored in the repository, wherein the sending is performed without waiting for the business object data to be completely stored; and proceeding, after the sending, to process the business object data for storage in the repository.

12. The system according to claim 11, wherein the receiving the message further comprises:

determining that the processed business object data is consistent.

13. The system according to claim 12, wherein an enterprise service framework is configured to determine consistency of the processed business object data.

14. The system according to claim 12, wherein determining that the processed business object data is consistent is made prior to the proceeding to process the business object data for storage in the repository.

15. The system according to claim 11, wherein the proceeding to process the business object data for storage in the repository is performed without an interaction from a user.

16. The method according to claim 1, wherein the business object data is organized to represent a business task, wherein the business task includes one or more of a purchase order, a sales order, a line item, an invoice, a customer contact information, or a customer payment account.

17. The computer program product according to claim 6, wherein the business object data is organized to represent a business task, wherein the business task includes one or more of a purchase order, a sales order, a line item, an invoice, a customer contact information, or a customer payment account.

18. The system according to claim 11, wherein the business object data is organized to represent a business task, wherein the business task includes one or more of a purchase order, a sales order, a line item, an invoice, a customer contact information, or a customer payment account.

* * * * *